United States Patent [19]

Lacroix

[11] Patent Number: 5,253,116
[45] Date of Patent: Oct. 12, 1993

[54] COLLIMATED VIEWING DEVICE WITH OFF-AXIS SPHERICAL MIRROR FOR SIMULATOR

[75] Inventor: Michel Lacroix, Bois d'Arcy, France

[73] Assignee: Thomson-CSF, Puteaux, France

[21] Appl. No.: 795,815

[22] Filed: Nov. 21, 1991

[30] Foreign Application Priority Data

Nov. 23, 1990 [FR] France ................................ 90 14618

[51] Int. Cl.⁵ ...................... G02B 17/06; G02B 23/06; G02B 9/08
[52] U.S. Cl. .................................... 359/858; 359/471; 359/859; 434/40; 434/44
[58] Field of Search ............... 359/631, 633, 630, 632, 359/462, 471, 482, 858, 859, 838; 434/40, 43, 44

[56] References Cited

U.S. PATENT DOCUMENTS

| | | | |
|---|---|---|---|
| 3,190,171 | 6/1965 | Reed | 88/1 |
| 3,574,262 | 4/1971 | Bowker | 35/12 |
| 3,923,370 | 12/1975 | Mostrom | 359/630 |
| 4,103,435 | 8/1978 | Herndon | 35/12 N |
| 4,348,187 | 9/1982 | Dotsko . | |

FOREIGN PATENT DOCUMENTS

| | | |
|---|---|---|
| 0461942 | 12/1991 | European Pat. Off. . |
| 2009084 | 1/1970 | France . |
| 1597669 | 8/1970 | France . |
| 1385908 | 3/1975 | United Kingdom . |

Primary Examiner—Jon W. Henry
Attorney, Agent, or Firm—Oblon, Spivak, McClelland, Maier & Neustadt

[57] ABSTRACT

An apparatus for a visual display in a training simulator. A projector illuminates a convex side of a spherical screen. A concave face of a spherical mirror facing the convex side of the spherical screen reflects the image on the spherical screen to a viewer. A second embodiment projects an image on a first mirror. The projected image is reflected onto a convex portion of a spherical screen. The image on the convex portion of the spherical screen is reflected to a concave mirror facing the convex face of the screen. A viewer sees the projected image on the concave mirror. The first mirror and the second mirror can be formed as one mirror.

5 Claims, 4 Drawing Sheets

5,253,116

COLLIMATED VIEWING DEVICE WITH OFF-AXIS SPHERICAL MIRROR FOR SIMULATOR

BACKGROUND OF THE INVENTION

1. Field of the Invention

The present invention relates to a collimated viewing device with an off-axis spherical mirror for a simulator.

2. Discussion of the Background

In collimated viewing devices having an off-axis spherical mirror with a wide angle of display, especially in the horizontal direction, the synthetic image is projected on the concave face of a ground screen that is located on the focal sphere of the spherical mirror. The luminous efficiency of the screen is about 30% to 40%, which may be considered as being insufficient to obtain contrasted and realistic displayed images, especially in the case of a very wide angle display (at least 180° horizontally and more than 40° vertically) for which the area to be illuminated is very great.

An object of the invention is a collimated viewing device of the above-mentioned type, the light efficiency of which is appreciably higher than that of the known devices without thereby, in any way, making it more costly.

SUMMARY OF THE INVENTION

According to the invention, there is proposed a collimated viewing device of the projection device type cooperating with an off-axis spherical mirror and a spherical screen located on the focal sphere of the mirror wherein the projection device illuminates the face of the screen that is facing the spherical mirror, said face of the mirror being advantageously its convex face. According to an advantageous embodiment, the projection device is fixed somewhat above the observer and illuminates an auxiliary mirror placed above the spherical mirror. Advantageously, the auxiliary mirror is an extension of the spherical mirror.

BRIEF DESCRIPTION OF THE DRAWINGS

The invention will be understood more clearly from the reading of a detailed description of several embodiments, taken as non-restrictive examples and illustrated by the appended drawings of which.

MORE DETAILED DESCRIPTION

The invention is explained here below with reference to a civilian aircraft simulator, but it is clearly not limited to such an application and may be implemented in any very wide angle system, whether it is a simulator or any apparatus requiring a projection device.

Figure 1:
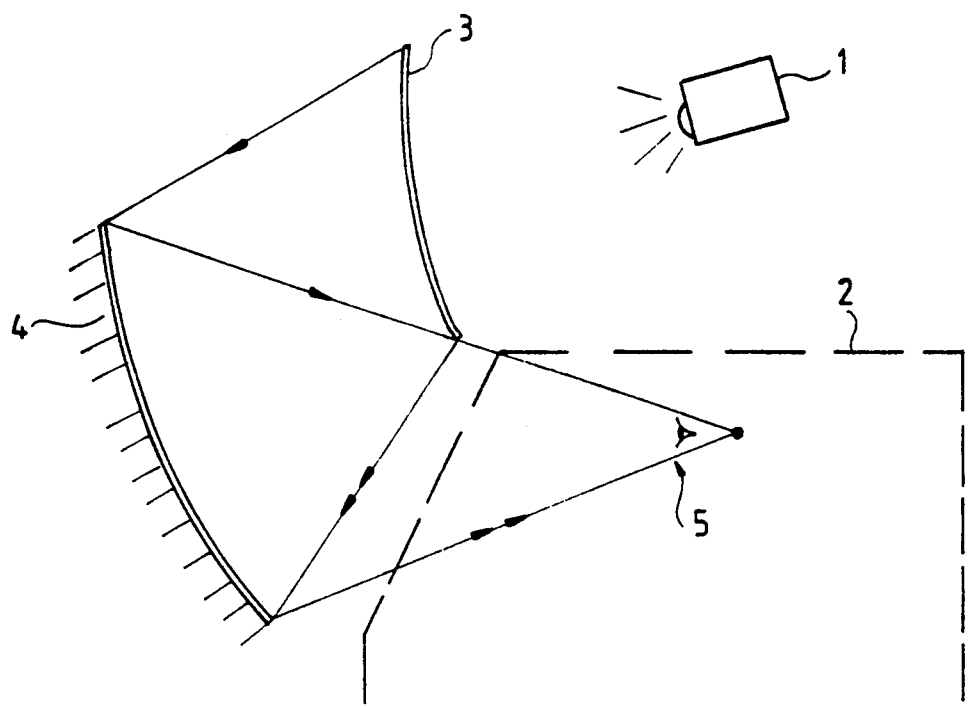
FIG. 1 shows a simplified drawing of a prior art viewing device.

The viewing device represented in FIG. 1 has a projection device 1, generally of the three-projector type, positioned substantially above the cabin 2 in which the observer using the simulator takes position. The projection device 1 illuminates the concave face of a scattering translucent spherical screen 3. The image formed on the concave face of the screen 3 is sent back by the mirror 4 to the observer's eye 5. The luminous efficiency of a device such as this is very low because a non-negligible part of the light flux is sent back to the projection device and because this screen cannot be made directional.

Figure 2:
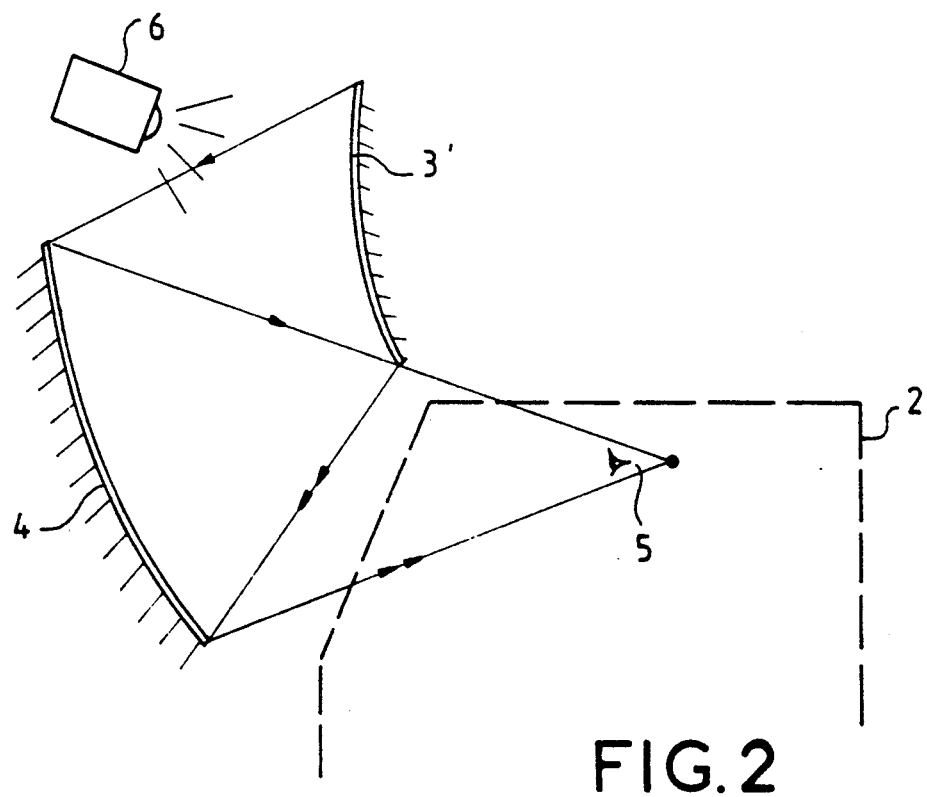
FIG. 2 shows a simplified drawing of a viewing device according to the invention.

The device of the invention shown briefly in FIG. 2, enables a substantial increase in the luminous efficiency. In this figure, the elements similar to those of FIG. 1 have been given the same numerical references. According to the invention, the spherical screen 3' is opaque and reflective on its convex face side (the side turned towards the mirror 4). The convex face of the screen 3' is illuminated by the projection device 6. It is naturally not impossible, from the optical point of view, to place the projection device 6 so that it faces the convex face of the screen 3', but this would require a bulky support to fix the projection device. This bulky support would have a long lever arm, at the end of which would be fixed the substantial mass of the projection device (at least several hundreds of kg-mass).

According to an advantageous aspect of the invention, the projection device is fixed above the cabin and illuminates the auxiliary mirror placed above the mirror, as described here below with reference to FIGS. 3 to 5.

Since the screen 3 is used as a reflector, since it always reflects the light beams from the projection device to the spherical mirror 4, and since all these elements are fixed with respect to one another, advantageously a screen with "gain" is used, namely a screen with a preferred direction of reflection: this is above all possible in the case of a single-user simulator, and enables a further increase in the luminosity of the viewing device.

Figure 3:
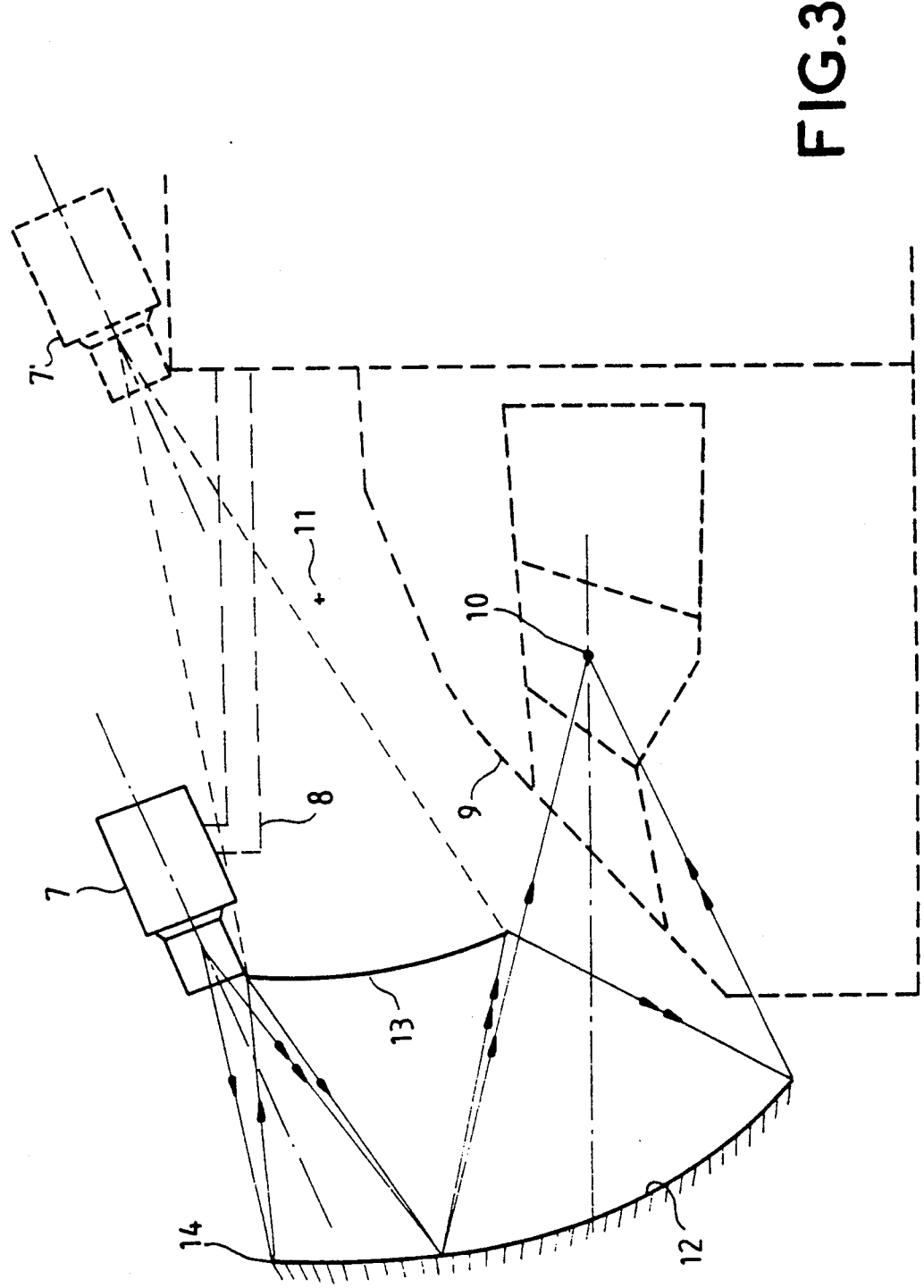
FIG. 3 is a drawing of a first embodiment of a viewing device according to the invention.

FIG. 3 shows a first embodiment of the viewing device according to the invention. The projection device 7 is fixed to a support 8, which is itself fixed to the cabin 9 of the simulator, in a position that is substantially symmetrical with the user's eye 10 in relation to the center 11 of the spherical mirror 12. The spherical screen 13 is positioned beneath the projection device 7. A cylindrical, spherical or plane mirror 14 is positioned just above the spherical mirror 12. Should the mirror 14 be spherical, it may advantageously be the continuation of the spherical mirror 12 so as to send back the light beams from the projection device 7 to the screen 13, and then to the spherical mirror 12 and finally to the user's eye 10.

The viewing device of FIG. 3 makes it necessary to modify the optical piece of the projection device 7 to provide for the projection on the convex face of the screen 13.

Figure 4:
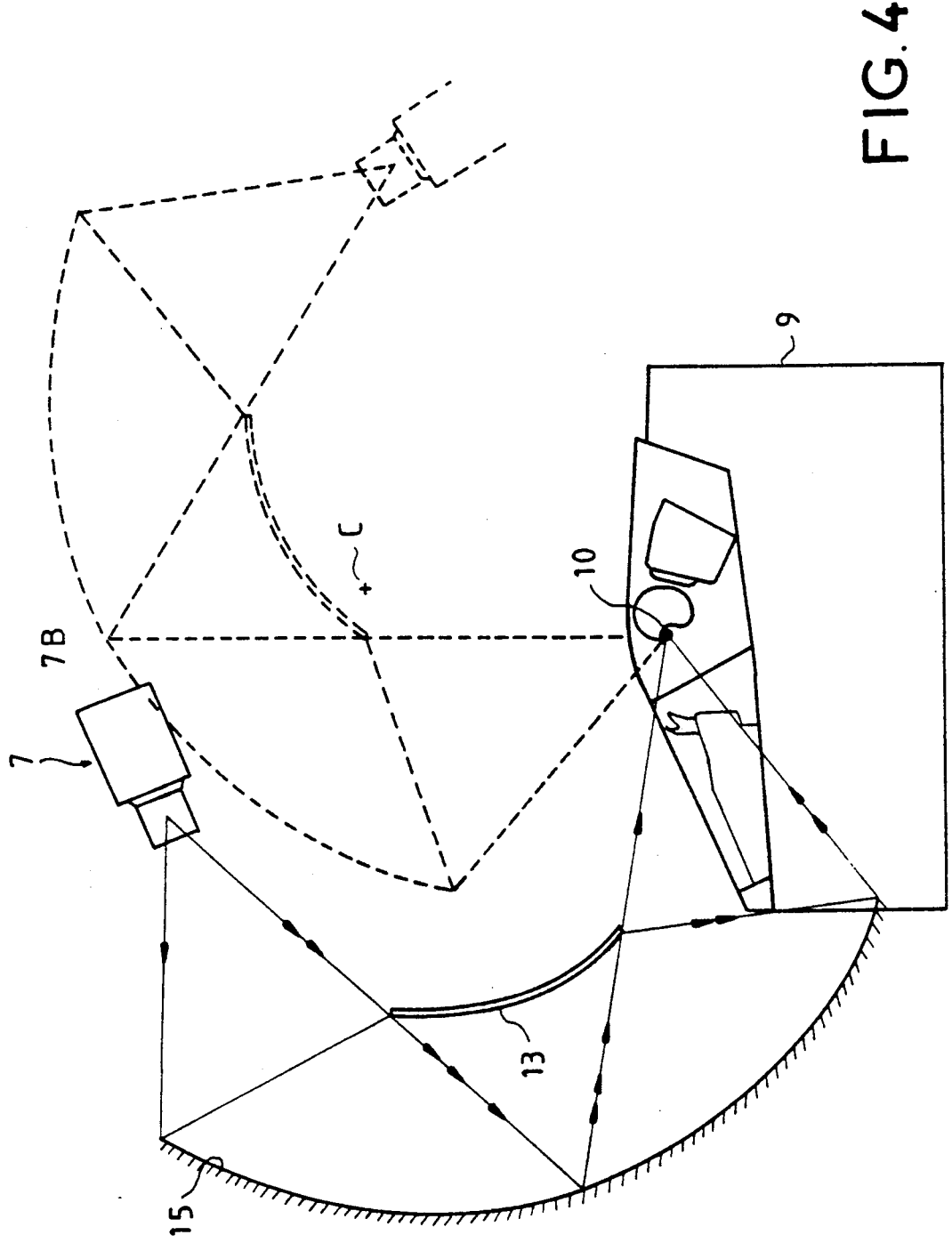
FIGS. 4 and 5 are drawings, seen in a side view and a top view respectively, of a second embodiment of a viewing device according to the invention.
Figure 5:
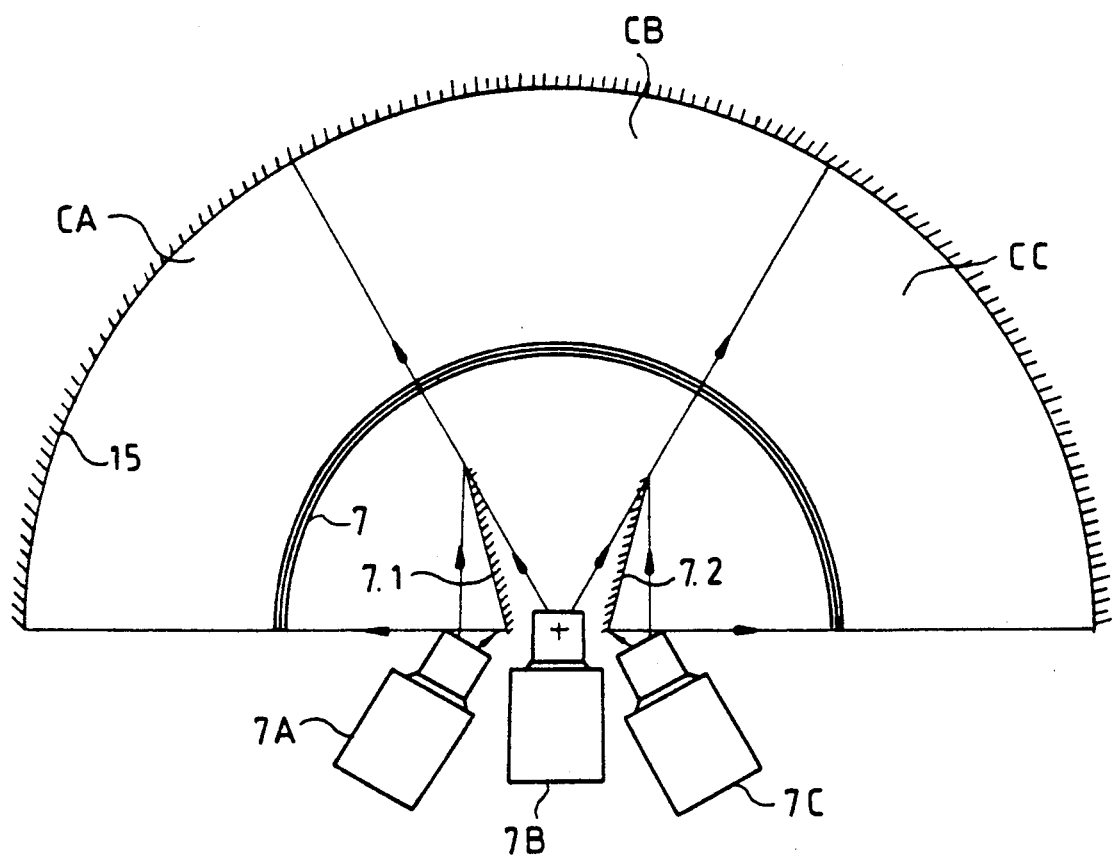

FIGS. 4 and 5 show another viewing device according to the invention. The elements similar to those of FIG. 3 are assigned the same numerical references. The main difference lies in the fact that the projection device 7 is fixed in a position that is symmetrical with the user's eye 10 in relation to the center C of the spherical mirror 15. The upper part of the mirror 15 is directly illuminated by the projection device 7, while its lower part receives the beams reflected by the screen 13.

The projection device 7 is adjusted to form an image at infinity.

In FIG. 4, broken lines show the extreme rear position of the viewing device that has tilted about a fictitious horizontal line, perpendicular to the plane of the figure, and is passing through the observation point 10. A tilting such as this of the entire viewing device enables an increase in the user's vertical visual field. This vertical visual field may then have an amplitude of about 130° (−40° to +90° with respect to a vertical plane passing through the observation point 10). It is also possible to make the entire viewing device rotate about a fictitious vertical axis passing through the point 10. The horizontal visual field may then have an amplitude of about 300°. These two rotations of the entire viewing device may then be servo-linked to motions of the user's head in a manner known per se. There is thus obtained a combination of a collimated image and of a zone of interest servo-linked to the position of the user's head. This arrangement is more realistic for the user who thus has an impression of depth of the image. The viewing device thus makes it possible to present a user such as the pilot of an aircraft with almost the entire real visual field. Naturally, the viewing device of FIG. 3 can also be driven in vertical and/or horizontal rotation in the same way as the device of FIG. 4.

The projection device 7 may be of any appropriate type, especially of the type with three projectors 7A, 7B, 7C as shown in FIG. 5. As shown in FIG. 5, it is possible to bring the end projectors 7A and 7C close to the central projector 7B and use mirrors 7.1, 7.2. These mirrors are positioned vertically so that each projector illuminates about ⅓ of the horizontal field (horizontal fields CA, CB, CC for the projectors 7A, 7B, 7C respectively). These projectors may be LCD projectors, high brilliance tube projectors etc.

If, given that the angle at which the rays are reflected by the screen is equal to their angle of incidence, the simulator is a single-observer simulator, the screen 13 may be of the wide gain type, for example with metal lining, having a gain in luminosity in the direction of reflection of about 3 to 5. The diameter of this screen may advantageously be of the order of 1.25 m to 1.5 m, its vertical field about 60° to 80° and its horizontal field about 180° or more.

As compared with the prior art approach using a ground screen, the use of a screen with gain makes it possible to multiply the luminance of the screen seen by the observer by about 9 to 15.

The mirror 12 and 14 of the mirror 15 may advantageously be made of composite plastic laminate which has the advantage of being light. Their radius may be of the order of 2.5 m to 3 m for the mirror 15 and 3 m to 3.7 m for the mirrors 12 and 14, and their horizontal field may be 180° or more. For the mirror 12, the vertical field may be about 40° to 50°, and the cylindrical mirror 14 has a horizontal field also of about 180° and a vertical field of about 20° to 25°. In the device of FIG. 4, the mirror 15 has a total vertical field of about 110° to 150° (namely, in relation to a horizontal plane passing through the point of observation 10), the vertical field seen by the observer being about 60° to 80° (the lower part of the mirror) and the vertical field illuminated by the projection device 7 being about 60° to 80°. This increase in the vertical field is made possible by the fact that the rays reflected by the spherical screen may be highly inclined with respect to the perpendicular to the screen at their point of impact on this screen, without any appreciable loss of the luminosity of the image seen by the observer. Should there be only one observer, whose eye is then almost at the center of the spherical mirror, the vertical field may have the higher values mentioned here above, for the collimation errors and the "divergences" are then reduced with respect to these errors in a standard wide angle viewing device with two observers.

Naturally, the optical system of the projectors should be capable of correcting the aberrations of sphericity and the astigmatism of the spherical mirror illuminated by the projection device arranged according to the invention.

What is claimed is:

1. A viewing device, comprising:
   a spherical screen having a convex side;
   a projector disposed on said convex side of said spherical screen, said projector for projecting directly onto said convex side of said spherical screen;
   a spherical mirror having a concave side facing said convex side of said spherical screen, said spherical mirror for directly receiving light from said convex side of said spherical screen, said concave side of said spherical screen for being viewed by a user of the viewing device.

2. A viewing device, comprising:
   a first mirror;
   a projector for projecting an image directly onto said first mirror;
   a spherical screen having a convex side facing said first mirror, said convex side of said spherical screen for directly receiving images from said first mirror projected by said projector;
   a second mirror having a concave reflecting surface facing said convex side of said spherical screen, said concave reflecting surface for directly receiving images from said convex side of said spherical screen, said second mirror reflecting an image from said convex side of said spherical screen directly to a viewer.

3. A viewing device according to claim 2, wherein said first mirror and said second mirror are one mirror.

4. A viewing device, comprising:
   a first mirror;
   a projector for projecting an image onto said first mirror;
   a spherical screen having a convex side facing said first mirror, said convex side of said spherical screen for receiving images from said first mirror projected by said projector;
   a second mirror having a concave reflecting surface facing said convex side of said spherical screen, said concave reflecting surface for receiving images from said convex side of said spherical screen, said second mirror reflecting an image from said convex side of said spherical screen to a viewer.

5. A viewing device according to claim 4, wherein said first mirror and said second mirror are one mirror.

* * * * *